(12) United States Patent
Hou et al.

(10) Patent No.: US 12,551,486 B2
(45) Date of Patent: Feb. 17, 2026

(54) RIVAROXABAN FORMULATION

(71) Applicant: Shanghai Auson Pharmaceuticals Co., Ltd., Shanghai (CN)

(72) Inventors: Peng Hou, Shanghai (CN); Enxian Lu, East Brunswick, NJ (US); Tao Zhu, Shanghai (CN)

(73) Assignee: SHANGHAI AUSON PHARMACEUTICALS CO., LTD. (CN)

( * ) Notice: Subject to any disclaimer, the term of this patent is extended or adjusted under 35 U.S.C. 154(b) by 0 days.

(21) Appl. No.: 19/092,739

(22) Filed: Mar. 27, 2025

(65) Prior Publication Data

US 2025/0249015 A1 Aug. 7, 2025

Related U.S. Application Data

(63) Continuation-in-part of application No. 17/501,519, filed on Oct. 14, 2021, now abandoned.

(30) Foreign Application Priority Data

Jun. 24, 2021 (CN) .......................... 202110704987.5

(51) Int. Cl.
 A61K 9/20 (2006.01)
 A61K 31/5377 (2006.01)
 A61K 9/00 (2006.01)

(52) U.S. Cl.
 CPC ........ *A61K 31/5377* (2013.01); *A61K 9/2009* (2013.01); *A61K 9/2013* (2013.01); *A61K 9/2018* (2013.01); *A61K 9/2027* (2013.01); *A61K 9/2054* (2013.01); *A61K 9/2059* (2013.01); *A61K 9/2095* (2013.01); *A61K 9/0053* (2013.01)

(58) Field of Classification Search
 CPC .......... A61K 9/28; A61K 9/2893; A61K 9/20; A61K 9/2095
 See application file for complete search history.

(56) References Cited

U.S. PATENT DOCUMENTS

2015/0037415 A1* 2/2015 Benke .................. A61K 9/2018
 514/236.8

FOREIGN PATENT DOCUMENTS

| CN | 102144975 A | 8/2011 |
|----|-------------|--------|
| CN | 105832671 A | 8/2016 |
| CN | 111904942 A | 11/2020 |

OTHER PUBLICATIONS

Fang, Liang: "Pharmaceutical Formulation", Published Mar. 31, 2016, pp. 357-366.

* cited by examiner

*Primary Examiner* — Micah Paul Young
(74) *Attorney, Agent, or Firm* — Fox Rothschild LLP

(57) ABSTRACT

This document discloses rivaroxaban tablets for oral suspension formulation for oral administration. Also disclosed is a method for preparing rivaroxaban tablets for oral suspension and a method of treating diseases.

16 Claims, No Drawings

RIVAROXABAN FORMULATION

CROSS REFERENCE TO RELATED APPLICATIONS

This application is a continuation-in-part of U.S. patent application Ser. No., filed Oct. 14, 2021, which claims priority to Chinese Patent Application No. 202110704987.5 filed Jun. 24, 2021, the contents of which are incorporated herein by reference in their entirety.

FIELD OF THE INVENTION

This patent document discloses a novel formulation of rivaroxaban or its pharmaceutically acceptable salt, a method for its preparation and its use in medical therapy.

BACKGROUND

Rivaroxaban is marketed in the United States by Janssen Pharmaceuticals, Inc., under the trade name XARELTO®, XARELTO is for the indication of reducing the risk of stroke and blood clots, treating blood clots in the veins, helping prevent blood clots, and also reducing the risk of serious heart problems, heart attack and stroke in people with coronary artery disease. XARELTO is an immediate release tablet. There are no liquid formulations of rivaroxaban commercially available and, as a result, pharmacists are often required to compound liquid formulations using crushed rivaroxaban tablets for pediatric patients and patients who cannot swallow tablets, for example, acutely ill medical patients who need medicine administered via an NG tube or gastric feeding tube. A need exists for an improved formulation of Rivaroxaban.

SUMMARY

Formulations for oral suspension preparation described herein allow for convenient oral administration of Rivaroxaban. These formulations address the dose inaccuracy issue due to the crushed step and precipitation of big crushed particles in a suspension system, Furthermore, tablets for oral suspension do not require professionals to crush the tablet and can be dispersed in the vehicles to form suspension immediately before use, which is much convenient for patients and professionals. Moreover, the tablets for oral suspension formulation substantially improves the stability of the medication compared to the ready-to-use suspension.

An aspect of this patent document provides a formulation suitable for reconstitution with a pharmaceutically acceptable carrier to form a suspension. The formulation contains rivaroxaban or a pharmaceutically acceptable salt thereof, and excipients including for example disintegrant agent, lubricant, glidant, binder, wetting agent, and filler. The rivaroxaban tablets for oral suspension can disintegrate rapidly within about 3 minutes in 100 ml water at room temperature, and the reconstituted suspension can pass through mesh aperture of 710 µm, furthermore, the tablet provides an in vitro release of at least about 75% of the rivaroxaban within about 30 minutes under USP dissolution apparatus 2, in 900 ml of pH4.5 media (2.5 mg) or with 0.2% SLS (for 10 mg strength) or 0.4% SLS (for 15 mg and 20 mg strength) at 75 rpm stirring rate.

In some embodiments, the formulation includes an internal phase enclosed by an external phase, wherein the internal phase comprises 10 to 20 mg of rivaroxaban, 8 to 12 mg of crospovidone and 2 to 4 mg of hypromellose (HPMC), wherein the external phase comprises a lubricant. In some embodiments, the formulation is characterized by one, two, or three of the following:
(i) a porosity of 20% to 24%;
(ii) a disintegration time of less than 60 seconds in aqueous medium when tested per USP <701> methodology using 710 µm mesh screen; and
(iii) a dissolution rate of not less than 85% within 15 minutes when tested using USP Apparatus II (paddle) at 75 RPM in 900 mL of pH 4.5 acetate buffer containing 0.4% w/v sodium lauryl sulfate (SLS).

In some embodiments, the internal phase is in the form of a plurality of granules being compressed together, wherein the plurality of granules comprise a first group of granules and second group of granules, wherein the first group of granules has an average particle diameter of less than 106 µm and ranges from 50% to 65% by weight in the formulation, and wherein the second group of granules has an average particle diameter of greater than 250 µm and ranges from 15% to 25% by weight in the formulation.

In some embodiments, the internal phase comprises 20 mg of rivaroxaban, 9-11 mg of crospovidone, and 3 mg of HPMC, and further comprises 45-50 mg of microcrystalline cellulose and 25-30 mg of lactose monohydrate. In some embodiments, the external phase comprises 0.3-0.6 mg of sodium lauryl sulfate, 1.5-2.5 mg of sodium stearyl fumarate, and 0.8-1.2 mg of colloidal silicon dioxide. In some embodiments, the internal phase comprises 20 mg of rivaroxaban, 10 mg of crospovidone, and 3 mg of HPMC, and further comprises 48 mg of microcrystalline cellulose and 29 mg of lactose monohydrate, and wherein the external phase comprises 0.5 mg sodium lauryl sulfate, 2.0 mg sodium stearyl fumarate, and 1 mg colloidal silicon dioxide.

In some embodiments, the external phase is free from rivaroxaban, crospovidone and/or HPMC. In some embodiments, the HPMC has a viscosity of about 5 cps.

In some embodiments, the amounts of the excipients are selected so that the dissolution rate is more than 90% within 15 minutes. In some embodiments, the amounts of the excipients are selected so that the disintegration time is less than 50 seconds. In some embodiments, the formulation is in the form of a tablet.

In some embodiments, the formulation is prepared according to a process comprising
(a) mixing a lubricant and a first portion of HPMC in purified water to form binder solution I;
(b) mixing a second portion of HPMC with rivaroxaban, crospovidone, microcrystalline cellulose and lactose monohydrate to form a dry mixture and then sieving the dry mixture;
(c) homogenizing the sieved dry mixture to form a dry blend;
(d) spraying the binder solution I to the dry blend to form granules;
(e) milling and then drying the granules; and
(f) blending the dried granules with an external phase.

In some embodiments, the first portion of HPMC ranges from 20% to 40% in the total weight of HPMC in the formulation.

Another aspect provides a method of treating or reducing the risk of a disease comprising:
(a) preparing a suspension from the formulation disclosed herein; and
(b) administering the suspension to a subject in need thereof;
wherein the disease is stroke or systemic embolism associated with nonvalvular atrial fibrillation, deep vein thrombosis (DVT), pulmonary embolism (PE), or myocardial infarction (MI) or stroke associated with chronic coronary artery disease (CAD) or peripheral artery disease (PAD).

In some embodiments, the disease is deep vein thrombosis (DVT) or pulmonary embolism (PE).

Another aspect provides a method of preparing the formulation disclosed herein, comprising:
(a) mixing a lubricant and a first portion of HPMC in purified water to form binder solution I;
(b) mixing a second portion of HPMC with rivaroxaban, crospovidone, microcrystalline cellulose and lactose monohydrate to form a dry mixture and then sieving the dry mixture;
(c) homogenizing the sieved dry mixture to form a dry blend;
(d) spraying the binder solution I to the dry blend to form granules;
(e) milling and then drying the granules; and
(f) blending the dried granules with an external phase.

DETAILED DESCRIPTION

This document discloses a formulation suitable for reconstitution with a pharmaceutically acceptable carrier to form a suspension oral dosage form of rivaroxaban. Advantages of the tablets for oral suspension formulation include avoiding tablet crushing, dose accuracy and better compliance for pediatric patients and patients who cannot swallow tablets in comparison with conventional immediate release non-suspension dosage forms.

Rivaroxaban is known as 5-chloro-N-[[(5S)-2-oxo-3-[4-(3-oxomorpholin-4-yl)phenyl]-1,3-oxazolidin-5-yl]methyl] thiophene-2-carboxamide. Rivaroxaban is insoluble in water. When crushed rivaroxaban tablets are simply added directly into water or other soft food, the compound tends to settle rapidly and cannot be easily redistributed and as such would potentially affect the dose accuracy delivered to a patient.

The formulation disclosed herein for the preparation of an oral suspension effectively resolved the above issues. After reconstitution, the suspension enables easy and accurate dose for pediatric patients and patients who cannot swallow tablets, for example, acutely ill medical patients who need medicine administered via an NG tube or gastric feeding tube. Further, formulation for oral suspension also substantially improves the stability of the medication compared to the ready-to-use suspension. The formulation described in this patent document are applicable to Rivaroxaban as well as salts, isomers, complexes, polymorphs, hydrates, esters and prodrugs thereof.

While the following text may reference or exemplify specific embodiments of a dosage form or a method of manufacturing the dosage from, it is not intended to limit the scope of the dosage form to such particular reference or examples. Various modifications may be made by those skilled in the art, in view of practical and economic considerations, such as the amount of individual excipients and the manufacturing condition.

The articles "a" and "an" as used herein refers to "one or more" or "at least one," unless otherwise indicated. That is, reference to any element or component of an embodiment by the indefinite article "a" or "an" does not exclude the possibility that more than one element or component is present.

The term "about" as used herein refers to the referenced numeric indication plus or minus 10% of that referenced numeric indication.

The term "active ingredient" or "active pharmaceutical ingredient" (API) refers to a compound (e.g. rivaroxaban) that can be used for treating a disorder or condition in a subject (e.g., a patient), or for preventing one or more symptoms of such disorder or condition in the subject.

The term "bioequivalence" or "bioequivalent" refers to two formulations, dosage forms, products, or compositions of an active ingredient having biological equivalence. It is generally considered bioequivalent if the 90% Confidence Interval ("CI") of the relative mean Cmax, AUC(0-t) and AUC(0-∞) of the test formulation to reference formulation (i.e., brand product) is within 80.0% to 125.0% in the fasting state of a tested subject.

The term "patient compliance" refers to the degree to which patient correctly follows medical advice.

The term "excipient" refers to any inert substance that may have specific functions to the active ingredient (e.g., filler agent, binder, lubricant, glidant). An excipient provides without limitation, bulk, consistency, stability, binding ability, lubrication, disintegrating ability, etc., to the formulation of an active ingredient. A "glidant" is a type of excipient. An excipient may function for multiple purposes.

The term "powder" as used herein refers to any composition or formulation which is dry and flowable. Non-limiting examples include granules, flakes, spheroids and other forms which can be readily prepared and mixed with an ingestible liquid to provide a desirable liquid suspension.

The term "wet granulation" refers to a process of using a liquid binder to lightly agglomerate the powder mixture.

The term "API" refer to active pharmaceutical ingredient, which is rivaroxaban or a pharmaceutically acceptable salt.

The term "release", "released", "releasing", and the like, when used in connection with a pharmaceutical compression or dosage form, refers to the process or the portion of the active ingredient that leaves the dosage form following contact with an aqueous environment. Unless otherwise indicated, the quantity of an active ingredient released from a dosage form is measured by dissolution testing in water as described in this invention. The results of the dissolution testing are reported as % (w/w) released as a function of time or as the release time. In some embodiments, complete release of an active ingredient occurs when at least 90% of the active ingredient has been released from the dosage form.

The term "immediate-release" refers to those which disintegration rapidly and/or get dissolved to release the medicaments or active ingredient.

The term "Cmax" or "peak plasma exposure", expressed in ng/mL, refers to the point of maximum concentration of drug in plasma.

The term "area under curve (AUC)" or "total plasma exposure", expressed in µg·hr/mL, refers to the total integrated area under plasma level time profile and expresses the total amount of the active ingredient that comes into systemic circulation after administration.

The term "D90" refers to the particle size corresponding to 90% of the cumulative undersize distribution by volume.

The term "pharmaceutically acceptable carrier" refers to an agent or a substance that enable an active ingredient or a composition thereof to be formulated as tablets, pills, dragees, capsules, liquids, gels, syrups, slurries, suspensions and the like, for administration to a subject in need. For example, the carrier can be water or an aqueous solution containing other excipients.

The term "subject" refers to a mammal, such as an animal or a human. Hence, the methods disclosed herein can be useful in human therapy and veterinary applications. In one embodiment, the subject is an animal. In another embodiment, the subject is a human.

The term "treat" or "treating" refers to attain or attaining a beneficial or desired result, such as a clinical result. In some embodiments, the beneficial or desired result is any one or more of the following: inhibiting or suppressing the onset or development of a condition, reducing the severity of the condition, reducing the number or severity of symptoms associated with the condition, increasing the quality of life of a patient suffering from the condition, decreasing the dose of another medication required to treat the condition, enhancing the effect of another medication a patient is taking for the condition, and prolonging the survival of a patient having the condition.

An aspect of the document provides a formulation suitable for reconstitution with a pharmaceutically acceptable carrier to form an oral suspension of rivaroxaban. The formulation includes rivaroxaban, a pharmaceutically acceptable salt, an isomer, a complex, a polymorph, a hydrate, or an ester thereof, a disintegrant, a binder, and one or more additional pharmaceutically acceptable excipients. In some embodiments, the formulation is a tablet.

In some embodiments, the formulation includes an internal phase enclosed by an external phase, wherein the internal phase comprises 10 to 20 mg of rivaroxaban, 8 to 12 mg of crospovidone and 2 to 4 mg of hypromellose (HPMC), wherein the external phase comprises a lubricant.

In some embodiments, the formulation is characterized by any one, two, three of the following:
  (i) a porosity of 20% to 24% by mercury porosimetry;
  (ii) a disintegration time of less than 60 seconds in aqueous medium when tested per USP <701> methodology using 710 μm mesh screens; and
  (iii) a dissolution rate of not less than 85% within 15 minutes when tested using USP Apparatus II (paddle) at 75 RPM in 900 mL of pH 4.5 acetate buffer containing 0.4% w/v sodium lauryl sulfate (SLS).

In some embodiments, the HPMC as a binder has a viscosity of 3, 4, 5, 6, 7, 8 cps or any range between the aforementioned values (e.g. 3-8, 4-8, 4-6 cps). In some embodiments, the binder consists essentially of HPMC. Other binders, even if present, are not in an effect amount to impact the disintegration time, dissolution, and/or assay. In some embodiments, more than 90%, more than 95%, more than 98%, or more than 99% of the binder is HPMC.

In some embodiments, the internal phase is in the form of a plurality of granules being compressed together, wherein the plurality of granules comprise a first group of granules and second group of granules. The first group of granules has an average particle diameter of less than 150 μm, less than 140 μm, less than 130 μm, less than 120 μm, less than 110 μm, less than 106 μm, less than 100 μm, or less than 90 μm. In some embodiments, the first group of granules has an average particle diameter of about 130 μm, about 120 μm, about 110 μm, about 106 μm, about 100 μm, about 90 μm, about 80 μm, about 75 μm, about 70 μm, about 60 μm, or any range between any two of the aforementioned values (e.g. 50-90 μm, 60-100 μm, 80-105 μm, 75-106 μm, etc.) The first group of granules is present by weight in the formulation by about 40%, about 45%, about 50%, about 55%, about 60%, about 65%, about 70%, or about 75%, or any range between any two of the aforementioned values (e.g. from 45% to 70%, from 50% to 65%, from 55% to 65% by weight in the formulation). The particle size can be determined by nested sieving using ASTM E11 standard sieves.

The second group of granules has an average particle diameter of greater than 200 μm, greater than 210 μm, greater than 220 μm, greater than 230 μm, greater than 240 μm, greater than 250 μm, greater than 260 μm, greater than 280 μm, or greater than 300 μm. In some embodiments, the second group of granules has an average particle diameter of about 200 μm, about 210 μm, about 220 μm, about 230 μm, about 240 μm, about 250 μm, about 260 μm, about 280 μm, about 300 μm, about 320 μm, about 340 μm, about 360 μm, about 380 μm, about 400 μm, or any range between any two of the aforementioned values (e.g. 250-300, 250-380 μm, etc.). The second group of granules is present by weight in the formulation by about 5%, about 10%, about 15%, about 20%, about 25%, about 30%, about 35%, or about 40%, or any range between any two of the aforementioned values (e.g. from 15% to 25%, from 10% to 20%, from 10% to 25% by weight in the formulation).

In some embodiments, the internal phase comprises 20 mg of rivaroxaban, crospovidone in an amount of 8, 9, 10, 11, 12, 13, 14 mg or any range between the aforementioned values, and HPMC in an amount of 2, 3, 4, 5 mg or any range between the aforementioned values. In some embodiments, the formulation further comprises microcrystalline cellulose in an amount of 40, 45, 50, 55 mg or any range between the aforementioned values and lactose monohydrate in an amount of 20, 25, 30, 35 mg or any range between the aforementioned values.

In some embodiments, the external phase comprises sodium lauryl sulfate in an amount of 0.2, 0.3, 0.4, 0.5, 0.6, 0.7, 0.8, 1.0 mg or any range between the aforementioned values, 1.5-2.5 mg of sodium stearyl fumarate in an amount of 1.0, 1.2, 1.3, 1.4, 1.5, 1.6, 1.7, 1.8, 2.0, 2.2, 2.2, 2.5, 2.7 mg or any range between the aforementioned values, and 0.8-1.2 mg of colloidal silicon dioxide in an amount of 0.6, 0.7, 0.8, 0.9, 1.0, 1.1 1.2, 1.3, 1.4, 1.5, 1.6, 1.7, 1.8, 2.0 mg or any range between the aforementioned values.

In some embodiments, the internal phase comprises 20 mg of rivaroxaban, 10 mg of crospovidone, and 3 mg of HPMC, and further comprises 48 mg of microcrystalline cellulose and 29 mg of lactose monohydrate, and wherein the external phase comprises 0.5 mg sodium lauryl sulfate, 2.0 mg sodium stearyl fumarate, and 1 mg colloidal silicon dioxide. In some embodiments, the external phase is free from any one, two, or three of rivaroxaban, crospovidone and HPMC.

In some embodiments, the formulation includes, by weight, a disintegrant ranging from about 5% to about 15%, a lubricant ranging from about 0.5% to about 5%, a glidant ranging from about 0.5% to about 3%, a wetting agent present ranging from about 0.1% to about 1%, a binder ranging from about 1% to about 8%, a filler ranging from about 10% to about 98%.

In some embodiments, the wetting agent is in a ratio with rivaroxaban or the pharmaceutically acceptable salt ranging from about 20:0.1 to about 1:1 by weight.

In some embodiments, the binder is in a ratio with rivaroxaban or the pharmaceutically acceptable salt ranging from about 20:0.5 to about 1:1 by weight.

In some embodiments, the pharmaceutically acceptable carrier is water or an aqueous solution containing one or more agents or excipients.

The rivaroxaban tablets for oral suspension can disintegrate rapidly within about 3 minutes (e.g. 160 seconds, 140 seconds, 120 seconds, 90 seconds, 60 seconds, or 30 seconds), within about 2 minutes (e.g. 100 seconds, 80 seconds, 60 seconds, or 30 seconds), or within about 1 minute (e.g. 30 seconds, 35 seconds, 40 seconds, 45 seconds, 50 seconds, or 55 seconds) in 100 ml water at room temperature, and the reconstituted suspension can pass through mesh aperture of 710 μm. Unless otherwise specified, the testing condition is under USP <701> methodology using a 710 μm mesh screen.

In some embodiments, the formulation provides an in vitro release of at least about 75%, at least about 80%, at least about 85%, at least about 90%, or at least about 92% of the rivaroxaban within about 30 minutes, within about 20 minutes, within about 15 minutes, or within about 10 minutes under USP dissolution apparatus 2, in 900 ml of pH 4.5 media (2.5 mg) or with 0.2% SLS (for 10 mg strength) or 0.4% SLS (for 15 mg and 20 mg strength) at 75 rpm stirring rate.

In some embodiments, the amounts of the excipients are selected so that the formulation disclosed herein has an acceptable assay of higher than 90%, higher than 92%, higher than 94%, higher than 95%, higher than 96%, higher than 97%, higher than 98%, or higher than 99%.

In some embodiments, the amounts of the excipients are selected so that the disintegration time is less than 50 seconds and the dissolution is more than 90% within 15 minutes.

In some embodiments, rivaroxaban or a pharmaceutically acceptable salt is present ranging from 1 mg to 50 mg, 10 mg to 20 mg or 15 mg to 20 mg. In some embodiments, the formulation (e.g. tablet) includes 2.5-20 mg rivaroxaban or a pharmaceutically acceptable salt thereof. In some embodiments, the formulation contains 20 mg of rivaroxaban.

In some embodiments, the rivaroxaban or a pharmaceutically acceptable salt is present ranging from about 1% to about 30%, from about 1.5% to about 25%, from about 1.8% to about 22%, or from about 2% to about 18% by weight.

In some embodiments, the disintegrant agent is present ranging from about 5% to about 15%, from about 5% to about 14%, from about 5% to about 13%, from about 6% to about 12%, from about 6% to about 11%, from about 6% to about 10% by weight.

In some embodiments, the lubricant agent is present ranging from about 0.2% to about 7%, from about 0.5% to about 5%, from about 1% to about 3%, from about 1.1% to about 2.5%, from about 1.3% to about 2.2% by weight, In some embodiments, the glidant agent is present ranging from about 0.5% to about 3%, from about 0.6% to about 2%, from about 0.7% to about 1.5%, from about 0.8% to about 1.2% by weigh.

In some embodiments, the wetting agent is present ranging from about 0.1% to about 1.2%, from about 0.1% to about 1%, from about 0.2% to about 0.8%, from about 0.2% to about 0.6% by weigh.

In some embodiments, the binder is present ranging from about 1% to about 8%, from about 1% to about 3.5%, from about 1.5% to about 3.5%, from about 2% to about 3% by weigh.

In some embodiments, the rivaroxaban or the pharmaceutically acceptable salt thereof and the wetting agent have a ratio ranging from about 20:0.1 to about 1:1, from about 20:0.2 to about 2:1, from about 20:0.3 to about 3:1, from about 20:0.4 to about 4:1 by weight.

In some embodiments, the rivaroxaban or the pharmaceutically acceptable salt thereof and the binder have a ratio ranging from about 20:0.5 to about 1:1 by weight, from about 20:0.8 to about 1:1, from about 20:1 to about 1:1

In some embodiments, the disintegrant agent is selected from starch, crosslinked polyvinylpyrrolidone (crospovidone), crosslinked sodium carboxymethyl cellulose (croscarmellose sodium), the modified starch sodium starch glycolate and any combination thereof. In some embodiments, the disintegrant agent is crospovidone (Kollidon CL-F).

In some embodiments, the dosage form further contains a lubricant selected from the group consisting of magnesium stearate, stearic acid, sodium stearyl fumarate, and sodium lauryl sulfate, glyceryl palmitostearate, and any combination thereof. In some embodiments, the lubricant is sodium stearyl fumarate.

In some embodiments, the formulation further contains glidants including for example silicon dioxide, starch, talc and any combination thereof. In some embodiments, the glidant is silicon dioxide.

In some embodiments, the wetting agent is selected sodium dodecyl sulfate (SLS) or sodium lauryl sulfate (SLS), poloxamers or pluronics, tween 80 and any combination thereof. In some embodiments, the wetting agent is sodium dodecyl sulfate (SLS).

In some embodiments, the binder is selected from Polyvinylpyrrolidone (PVP), Hydroxypropyl methylcellulose (HPMC), hydroxypropyl cellulose (HPC) and any combination thereof. In some embodiments, the binder is Hydroxypropyl methylcellulose (HPMC).

In some embodiments, the formulation further contains a filler selected from the group consisting of sucrose, dextrose, mannitol, sorbitol, maltitol, starch, lactose, microcrystalline cellulose, and any combination thereof in about 10% to about 98%, from about 30% to about 95%, from about 45% to about 93%, from about 60% to about 90% by weight. In some embodiments, the filler is microcrystalline cellulose and lactose, with the ratio ranging from about 5:1 to about 1:5, from about 4:1 to about 1:2, from about 3:1 to about 1:1, from about 2:1 to about 1:1 by weight.

In some embodiments, the tablet has an inner phase and an external phase. The inner phase includes rivaroxaban, hydroxypropyl methylcellulose, sodium lauryl sulfate, crosslinked polyvinylpyrrolidone (crospovidone), 70-95% of the total microcrystalline cellulose, and lactose monohydrate, while the external phase includes the remaining amount of microcrystalline cellulose, colloidal silicon dioxide and lubricant. In some embodiments, the ratio between the microcrystalline cellulose and the lactose monohydrate ranges from 1:1 to 2:1 or from 1.5-1.8:1 by weight. In some embodiments, substantially all of the lactose monohydrate is in the inner portion.

In some embodiments, the tablet by weight includes 1.0%-30.0% rivaroxaban, 1.0%-8.0% hydroxypropyl methylcellulose, 0.1-1% sodium lauryl sulfate, 5%-15.0% crosslinked polyvinylpyrrolidone (crospovidone), 0.5%-3.0% colloidal silicon dioxide, 0.5%-5% lubricant (e.g. magnesium stearate or sodium stearyl fumarate), and filler (e.g. microcrystalline cellulose and the lactose monohydrate).

In some embodiments, the tablet by weight includes 1.5%-25.0% rivaroxaban, 1.0%-5.0% hydroxypropyl methylcellulose, 0.2-0.8% sodium lauryl sulfate, 6.0%-12.0% crosslinked polyvinylpyrrolidone (crospovidone), 0.6%-2.0% colloidal silicon dioxide, 1.0%-3.0% sodium stearyl fumarate, and microcrystalline cellulose and the lactose monohydrate as filler.

In some embodiments, the tablet by weight includes 1.8%-22.0% rivaroxaban, 1.5%-3.5% hydroxypropyl methylcellulose, 0.2-0.8% sodium lauryl sulfate, 6.0%-12.0% crosslinked polyvinylpyrrolidone (crospovidone), 0.7%-1.5% colloidal silicon dioxide, 1.1%-2.5% sodium stearyl fumarate, and microcrystalline cellulose and the lactose monohydrate as filler.

In some embodiments, the tablet by weight includes 2.0%-18.0% rivaroxaban, 2.0%-3.0% hydroxypropyl methylcellulose, 0.2-0.6% sodium lauryl sulfate, 6.0%-10.0% crosslinked polyvinylpyrrolidone (crospovidone), 0.8%-1.2% colloidal silicon dioxide, 1.3%-2.2% sodium stearyl fumarate, and microcrystalline cellulose and the lactose monohydrate as filler.

In some embodiments, the rivaroxaban or the pharmaceutically acceptable salt thereof has a D90 ranging from about 1 µm to about 50 µm, from about 2 µm to about 40 µm, from about 3 µm to about 30 µm, from about 4 µm to about 20 µm prior to being mixed with the excipients.

In some embodiments, a dosage form can be manufacture via wet granulation, dry granulation, dry blending, melt granulation and fluid bed granulation approach. In some embodiments, a dosage form can be manufactured via wet granulation approach in high shear granulator.

In some embodiments, a dosage form can be manufactured via wet granulation by adding from about 20% to about 60%, from about 30% to about 50% of water to the powder in high shear granulator.

The rivaroxaban tablets for oral suspension can disintegration rapidly within 3 minutes within about 2 minutes, within about 1 minutes when dispersing in the 100 ml water at room temperature.

In some embodiments, the formulation has a porosity of 15%, 18%, 20%, 22%, 25%, 28%, 30%, 32%, 35%, or any range between any two of the aforementioned values (e.g. 20% to 24%, 20%-26%, 18%-25%). The porosity can be determined with mercury porosimetry, which is a laboratory technique for characterizing the pore structure of porous materials, such as pharmaceutical tablets. It involves the controlled intrusion of mercury into the pores of a sample under varying pressures. Due to mercury's non-wetting properties (high surface tension and contact angle >90°), external pressure is required to force mercury into progressively smaller pores. By measuring the volume of mercury intruded at each pressure level, the method provides data on porosity, across a wide range of pore diameters (typically from ~3 nm to 400 µm).

For example, a general procedure for mercury porosimetry can include the following steps:
1. Dry the Sample
   Thoroughly dry the tablet sample under vacuum to remove moisture, ensuring no residual water interferes with mercury intrusion.
2. Measure Apparent Volume
   Calculate the tablet's apparent volume using its geometric dimensions. For a cylindrical tablet: $V_{apparent} = \pi r^2 h$
3. Load Sample and Evacuate
   Place the dried tablet into the sample chamber and evacuate the chamber to a high vacuum (<10 Pa) to remove air trapped in the pores.
4. Apply Pressure and Record Intrusion Volume Gradually increase pressure from ~0.1 psi to 60,000 psi. Record the total intruded mercury volume ($V_{Hg}$) (cumulative volume measured by the instrument).
5. Calculate Porosity $$\in (\%) = (V_{Hg}/V_{apparent}) \times 100\%$$

The tablets for oral suspension formulation provide an in vitro release as measured by USP dissolution apparatus 2. In some embodiments, at least about 95%, at least about 90%, at least about 85%, at least about 80%, at least about 75%, at least about 65% or at least about 50% of 2.5 mg rivaroxaban is released in a pH4.5 medium within about 30 minutes, within about 20 minutes, within about 10 minutes at 75 rpm stirring rate.

The tablets for oral suspension formulation provide an in vitro release as measured by USP dissolution apparatus 2. In some embodiments, at least about 95%, at least about 90%, at least about 85%, at least about 80%, at least about 75%, at least about 65% or at least about 50% of 10 mg rivaroxaban is released in a pH4.5 medium with 0.2% SLS within about 30 minutes, within about 20 minutes, within about 10 minutes at 75 rpm stirring rate The tablets for oral suspension formulation provide an in vitro release as measured by USP dissolution apparatus 2. In some embodiments, at least about 95%, at least about 90%, at least about 85%, at least about 80%, at least about 75%, at least about 65% or at least about 50% of 15 mg or 20 mg rivaroxaban is released in a pH4.5 medium with 0.4% SLS within about 30 minutes, within about 20 minutes, within about 10 minutes at 75 rpm stirring rate.

The tablets for oral suspension formulation can also provide a release of rivaroxaban bioequivalent to non-suspension formulation of rivaroxaban at the same dose. Examples of non-suspension formulation of rivaroxaban include rivaroxaban tablets. In some embodiments, the dose of rivaroxaban in the formulation is about 1 mg, 2.5 mg, 5 mg, 10 mg, 20 mg, 40 mg or 50 mg.

The suspension can be prepared from the above described tablets for oral suspension formulation by reconstitution or by mixing the necessary components in suitable means as long as the resulting suspension achieves a desirable profile for oral administration. For example, the suspension can be prepared by adding water to the above described tablets formulation containing suitable dosage of rivaroxaban or its salt and thoroughly mix the combined substances.

The tablets for oral suspension allow for accurate dose and easy administration. The tablets for oral suspension formulation also have excellent stability compared to ready-to-use suspension. This is especially important for pediatric patients and patients who cannot swallow tablets, for example, acutely ill medical patients who need medicine administered via an NG tube or gastric feeding tube.

Another aspect of the patent document provides a method of preparing the above described formulation. The method generally includes:

Step 1 Dissolve wetting agent and partial binder (¼-½) in certain amount of water to form solution 1

Step 2 Pass internal phase excipient (including partial binder) through certain mesh and add them into high shear granulator Step 3 Pre-mix the internal phase excipient before adding granulation liquid Step 4 Add granulation fluid into excipient at certain speed while mixing Step 5 After all the granulation liquid was added, the kneading step was added for certain time Step 6 The wet mass pass through mill and then was dried in the fluid bed or oven under certain temperature Step 7 The dried granule pass through mill with screen of certain orifice Step 8 The screened granules mixed with external phase before compressed into tablets.

Step 9 The final blend was compressed into tablets of certain hardness.

In some embodiments, the tablet disclosed herein is prepared according to the following method:
  (a) SLS and a portion of HPMC (20-40% of total HPMC) were dissolved in purified water to form Binder Solution 1.
  (b) The remaining HPMC was dry-mixed with Rivaroxaban, Kollidon CL-F, Lactose Monohydrate and Microcrystalline Cellulose, followed by sieving.
  (c) The mixture was transferred to a high-shear mixer and homogenized for 3 minutes.
  (d) Wet granulation was performed by spraying Binder Solution 1 into the dry blend over 5 minutes.
  (e) The granules were milled, dried in a fluidized bed dryer, and sieved.
  (f) The dried granules were blended with the external phase (Sodium Stearyl Fumarate, Microcrystalline Cellulose, and Colloidal Silicon Dioxide).

The final blend can be compressed into tablets with a target hardness of 40±5 N.

In some embodiments, 30% of the total amount of hydroxypropyl methylcellulose is used in step 1. In some embodiments, the particle size of crospovidone is Cl-F level.

Exemplary methods of preparation include dry powder blending, wet granulation, dry granulation by compaction/slugging, spray drying, hot melt extrusion, extrusion spheronization and fluidized bed granulation. As described above, in order to have good uniformity, the active ingredient and all the excipients in the powder formulation should have suitable particle size range and need to pass certain mesh before using, such as mesh 20, 40, 60, 80 or 100.

Another aspect of the patent document provides a method of treating or prophylaxis or reducing the risk of a disease comprising administering the suspension prepared from tablets described herein or the whole tablet to a subject in need, wherein the disease is selected from the group consisting of stroke and systemic embolism in patients with nonvalvular atrial fibrillation, deep vein thrombosis (DVT), pulmonary embolism (PE), major cardiovascular events (cardiovascular (CV) death, myocardial infarction (MI) and stroke) in patients with chronic coronary artery disease (CAD) or peripheral artery disease (PAD).

EXAMPLES

Example 1—Disintegrant Types Selection Formulation compositions of rivaroxaban tablets with different types of disintegrants were prepared and shown in Table 1. The tablets were prepared by dry blend approach. The formulation with Kollidon CL-F has a short disintegration time.

TABLE 1

The composition of formulation with different types of disintegrants

| | 10 mg/tablet | | |
| Component | Formulation 1 | Formulation 2 | Formulation 3 |
| --- | --- | --- | --- |
| Internal phase | | | |
| Rivaroxaban | 10 | 10 | 10 |
| Croscarmellose Sodium | 10 | / | / |
| Sodium Starch Glycolate | / | 10 | / |
| Kollidon CL-F | / | / | 10 |
| Hypromellose | 1.5 | 1.5 | 1.5 |
| Microcrystalline Cellulose | 42.17 | 42.17 | 42.17 |
| Lactose Monohydrate | 33.73 | 33.73 | 33.73 |
| Colloidal Silicon Dioxide | 1.1 | 1.1 | 1.1 |
| Sodium Lauryl Sulphate | 0.5 | 0.5 | 0.5 |
| External phase | | | |
| Sodium Stearyl Fumarate | 2 | 2 | 2 |
| Microcrystalline Cellulose | 11.1 | 11.1 | 11.1 |
| Colloidal Silicon Dioxide | 1.1 | 1.1 | 1.1 |
| Total tablet weight | 113.2 | 113.2 | 113.2 |
| Disintegration time, acceptance criteria ≤60 seconds | 32 s | 28 s | 17 s |

Direct Compression: All the materials except sodium stearyl fumarate were put into a mixer and mixed for 15 minutes at a speed of 15 rpm. Then, sodium stearyl fumarate was added to the above-mentioned mixer and mixed for 10 minutes at a speed of 15 rpm. The final blend was compressed into tablets.

Disintegration time: place 6 dosage units in each of the 6 tubes of the basket-rack assembly (inside diameter of 710 μm instead of 1.8-2.2 mm as per USP<701). Operate the apparatus, using water as the immersion fluid, maintained at 15-25° C. At the end of the time limit specified in the monograph, lift the basket-rack assembly from the water, and observe the tablets. All-of the tablets should have disintegrated completed within 60 seconds.

Dissolution method: Paddle, 75 rpm, 900 ml of pH4.5 acetate buffer solution with 0.2% SLS.

Example 2—Disintegrant Levels Selection

The formulation with different levels of disintegrant (Kollidon CL-F) was prepared and shown in table 2.

TABLE 2

The composition of formulation with different levels of disintegrant

| | 10 mg/tablet | | |
| Component | Formulation 4 | Formulation 5 | Formulation 6 |
| --- | --- | --- | --- |
| Internal phase | | | |
| Rivaroxaban | 10 | 10 | 10 |
| Kollidon CL-F | 10 (8.8%) | 7 (6.18%) | 13 (11.5%) |
| Hypromellose | 1.5 | 1.5 | 1.5 |
| Microcrystalline Cellulose | 42.17 | 43.67 | 40.67 |
| Lactose Monohydrate | 33.73 | 35.23 | 32.23 |
| Colloidal Silicon Dioxide | 1.1 | 1.1 | 1.1 |
| Sodium Lauryl Sulphate | 0.5 | 0.5 | 0.5 |

TABLE 2-continued

The composition of formulation with different levels of disintegrant

| | 10 mg/tablet | | |
|---|---|---|---|
| Component | Formulation 4 | Formulation 5 | Formulation 6 |
| External phase | | | |
| Sodium Stearyl Fumarate | 2 | 2 | 2 |
| Microcrystalline Cellulose | 11.1 | 11.1 | 11.1 |
| Colloidal Silicon Dioxide | 1.1 | 1.1 | 1.1 |
| Total tablet weight | 113.2 | 113.2 | 113.2 |
| Disintegration time | 114 s | 108 s | 125 s |
| Dissolution (Q at 30 min) | 100.4% | 96.0% | 100.5% |

Dissolution method: Paddle, 75 rpm, 900 ml of pH4.5 acetate buffer solution with 0.2% SLS. The process is as follows:

(1) Sodium Lauryl Sulphate and Hypromellose were dissolved in water to form solution I.
(2) The internal phase (Rivaroxaban, Lactose Monohydrate and Colloidal Silicon Dioxide) was mixed and sieved)
(3) The above mixture was added into high sheer mixer and mixed for 3 min
(4) A wet granulation was carried out by adding solution I to the dry mixtures within 5 min.
(5) The wet granule was milled and dried in a fluid bed dryer
(6) The dry granule was milled and mixed with external phase
(8) The final blend was compressed into tablets with average hardness 40±5N.

In conclusion: The disintegrant levels in the range 6.18% to 11.5% did not have any significant effect on the disintegration time and dissolution of tablet. However, the disintegration time of these formulation is too long (>60 s).

Example 3—Binder Types Selection

TABLE 1

Composition of Rivaroxaban Tablet Formulations (mg/tablet) with Varied Binder Types

| | mg/tablet | | | |
|---|---|---|---|---|
| Ingredients | Formulation 7 | Formulation 8 | Formulation 9 | Formulation 10 |
| Internal phase | | | | |
| Rivaroxaban | 20 | 20 | 20 | 20 |
| Kollidon CL-F | 10 | 10 | 10 | 10 |
| Hypromellose (5CPS) | 3 (100% in binder solution) | / | / | / |
| Hypromellose (15CPS) | / | 3 (100% in binder solution) | / | / |
| Povidone K29/32 | / | / | 3 (100% in binder solution) | / |
| Sodium carboxymethylcellulose | / | / | / | 3 (100% in binder solution) |
| Microcrystalline Cellulose | 36.58 | 36.58 | 36.58 | 36.58 |
| Lactose Monohydrate | 28.92 | 28.92 | 28.92 | 28.92 |
| Sodium Lauryl Sulphate | 0.5 (100% in binder solution) | 0.5 (100% in binder solution) | 0.5 (100% in binder solution) | 0.5 (100% in binder solution) |
| External phase | | | | |
| Sodium Stearyl Fumarate | 2.0 | 2.0 | 2.0 | 2.0 |
| Microcrystalline Cellulose | 11.1 | 11.1 | 11.1 | 11.1 |
| Silicon Dioxide | 1.1 | 1.1 | 1.1 | 1.1 |
| Total tablet weight | 113.2 | 113.2 | 113.2 | 113.2 |

Preparation: Sodium Lauryl Sulphate (SLS) and Hypromellose (HPMC) were dissolved in purified water to form Binder Solution 1. The internal phase (Rivaroxaban, Kollidon CL-F, Lactose Monohydrate and Microcrystalline Cellulose) was blended and sieved. The above mixture was transferred to a high-shear mixer and homogenized for 3 minutes. Wet granulation was performed by spraying Binder Solution 1 into the dry blend over 5 minutes. The obtained wet granules were milled, dried in a fluidized bed dryer, and sieved. The above dried granules were blended with the external phase (Sodium Stearyl Fumarate, Microcrystalline Cellulose, and Colloidal Silicon Dioxide). The final blend was compressed into tablets with a target hardness of 40±5 N.

TABLE 2

Outcomes of F4 to F7

| Attributes | Acceptance criteria | Formulation 7 | Formulation 8 | Formulation 9 | Formulation 10 |
|---|---|---|---|---|---|
| Assay | 95%~105% | 99.3% | 96.3% | 99.8% | 101.3% |
| Disintegration time, Seconds | ≤60 s | 131 | 325 | 37 | 165 |
| Dissolution, 15 min | ≥85% | 93.6 | 96.2 | 83.4 | 94.5 |

In conclusion: The evaluation of tablets formulated with different binders demonstrated distinct performance characteristics. F 7 (HPMC 5 cps) exhibited compliant assay (99.3%) and dissolution (93.6%) within acceptance criteria (95-105% and ≥85% at 15 min, respectively). However, its disintegration time (131 s) exceeded the limit (≤60 s). F 8 (HPMC 15 cps) showed acceptable assay (96.3%) and dissolution (96.2%) but had an excessively prolonged disintegration time (325 s). F 9 (povidone K30) achieved rapid disintegration (37 s) and met assay specifications (99.8%), yet dissolution fell slower (83.4% vs. ≥85%). F 10 (sodium carboxymethyl cellulose) displayed acceptable assay (101.3%) and a prolonged disintegration (165 s), though dissolution was satisfactory (94.5%). Among these, F 7 (HPMC 5 cps) was selected for further development due to its robust assay and dissolution performance, which are critical for in vivo performance. While its disintegration time requires optimization, HPMC 5 cps demonstrates a favorable balance of attributes compared to other binders. Future studies will focus on adjusting HPMC levels or new process to improve disintegration without compromising assay or dissolution.

Procedure for assay assessment. A tablet was weighed and transferred into a volumetric flask. Diluent was added [Purified Water-Acetonitrile (50:50)] to approximately 80% of the final volume. The flask was sonicated for 40 minutes with an ice pack and shaken intermittently for about every 10 minutes. It was allowed to equilibrate to room temperature. The mixture was diluted to the final volume with the diluent and mixed thoroughly. The resulting solution was filtered through a 0.22 μm PVDF syringe filter into an HPLC vial. The first 4 mL of the filtrate was discarded. An amount of 20 μl was taken precisely and injected into the liquid chromatograph. The chromatogram was recorded. Additionally, 20 mg of the Rivaroxaban Reference Standard was weighed into a 100-mL volumetric flask. About 80 mL of the Diluent was added and sonicated for 5 minutes to dissolve the substances. The mixture was diluted to the final volume with the diluent and mixed well. The solution was analyzed using the same method described above. The content is determined by the external standard method based on the peak area. For a test tablet of 2.5 mg, a volumetric flask of 100 ml was used to prepare a concentration of 250 μg/mL. For a test tablet of 10 mg, a volumetric flask of 500 ml was used to prepare a concentration of 200 μg/mL. For a test tablet of 15 mg, a volumetric flask of 500 ml was used to prepare a concentration of 240 μg/mL. For a test tablet of 20 mg, a volumetric flask of 500 ml was used to prepare a concentration of 240 μg/mL.

Example 4—Hypromellose (HPMC) Distribution and Process Studies

TABLE 3

Composition of Rivaroxaban Tablet Formulations (mg/tablet) with Varied Hypromellose Distribution in Binder Solution

| | mg/tablet | | | | | |
|---|---|---|---|---|---|---|
| | Formulation 11 | Formulation 12 | Formulation 13 | Formulation 14 | Formulation 15 | Formulation 16 |
| Ingredients | Process 1 | Process 2 | Process 3 Internal phase | Process 3 | Process 3 | Process 3 |
| Rivaroxaban | 20 | 20 | 20 | 20 | 20 | 20 |
| Kollidon CL-F | 10 | 10 | 10 | 10 | 10 | 10 |
| Hypromellose | 3 (100% in binder solution) | 3(0% in binder solution) | 3(20% in binder solution) | 3(40% in binder solution) | 3(60% in binder solution) | 3(80% in binder solution) |
| Microcrystalline Cellulose | 36.58 | 36.58 | 36.58 | 36.58 | 36.58 | 36.58 |
| Lactose Monohydrate | 28.92 | 28.92 | 28.92 | 28.92 | 28.92 | 28.92 |
| Sodium Lauryl Sulphate | 0.5(100% in binder solution) | 0.5(100% in binder solution) | 0.5(100% in binder solution) | 0.5(100% in binder solution) | 0.5(100% in binder solution) | 0.5(100% in binder solution) |

TABLE 3-continued

Composition of Rivaroxaban Tablet Formulations (mg/tablet) with Varied Hypromellose Distribution in Binder Solution

| | mg/tablet | | | | | |
|---|---|---|---|---|---|---|
| | Formulation 11 | Formulation 12 | Formulation 13 | Formulation 14 | Formulation 15 | Formulation 16 |
| External phase | | | | | | |
| Sodium Stearyl Fumarate | 2.0 | 2.0 | 2.0 | 2.0 | 2.0 | 2.0 |
| Microcrystalline Cellulose | 11.1 | 11.1 | 11.1 | 11.1 | 11.1 | 11.1 |
| Silicon Dioxide | 1.1 | 1.1 | 1.1 | 1.1 | 1.1 | 1.1 |
| Total tablet weight | 113.2 | 113.2 | 113.2 | 113.2 | 113.2 | 113.2 |

Manufacturing Process 1:
1. Sodium Lauryl Sulphate (SLS) and Hypromellose (HPMC) were dissolved in purified water to form Binder Solution 1.
2. The internal phase (Rivaroxaban, Kollidon CL-F, Lactose Monohydrate and Microcrystalline Cellulose was blended and sieved.
3. The mixture was transferred to a high-shear mixer and homogenized for 3 minutes.
4. Wet granulation was performed by spraying Binder Solution 1 into the dry blend over 5 minutes.
5. The granules were milled, dried in a fluidized bed dryer, and sieved.
6. The dried granules were blended with the external phase (Sodium Stearyl Fumarate, Microcrystalline Cellulose, and Colloidal Silicon Dioxide).
7. The final blend was compressed into tablets with a target hardness of 40±5 N.

Manufacturing Process 2:
1. SLS was dissolved in purified water to form Binder Solution 1.
2. The internal phase (Rivaroxaban, HPMC, Kollidon CL-F, Lactose Monohydrate and Microcrystalline Cellulose was blended and sieved.
3. Steps 3-7 followed the same protocol as Process 1.

Manufacturing Process 3:
1. SLS and a portion of HPMC (20-80% of total HPMC) were dissolved in purified water to form Binder Solution 1.
2. The remaining HPMC was dry-mixed with Rivaroxaban, Kollidon CL-F, Lactose Monohydrate and Microcrystalline Cellulose, followed by sieving.
3. Steps 3-7 followed the same protocol as Process 1.

TABLE 4

Outcomes of F8 to F13

| Attributes | Acceptance criteria | Formulation 11 | Formulation 12 | Formulation 13 | Formulation 14 | Formulation 15 | Formulation 16 |
|---|---|---|---|---|---|---|---|
| Assay | 95%~105% | 100.5% | 93.2% | 99.8% | 100.1% | 101.5% | 102.3% |
| Disintegration time, Seconds | ≤60 s | 123 | 36 | 45 | 55 | 98 | 135 |
| Dissolution, 15 min | ≥85% | 95.2 | 87.2 | 94.8 | 93.5 | 93.7 | 92.4 |
| Particle size of internal phase granules, >250 μm <106 μm | Report | 36.3% 43.6% | 13.5% 65.8% | 24.8% 50.2% | 16.4% 63.6% | 19.4% 57.5% | 29.4% 46.2% |
| Porosity* | value | 11% | 27% | 24% | 20% | 14% | 8% |

*The ratio of the volume of voids (pores) in a material to the total volume of the material, expressed as a percentage, porosity % = (1-density of the tablet/true density) × 100%.

In conclusion: The results indicated that F 12 exhibited rapid disintegration (36 s) but failed the assay specification (93.2%), suggesting potential content uniformity or process-related issues. F11, F15 and F 16 showed delayed disintegration (123 s, 98 s and 135 s, respectively), likely due to the higher proportion of Hypromellose (100%, 60% and 80% in the binder solution), though dissolution remained compliant. F13 (20% in the binder solution) and F14 (40% in the binder solution) met all acceptance criteria (assay: 95-105%, disintegration time: ≤60 s, dissolution: ≥85% at 15 min), demonstrating balanced performance.

Example 4—HPMC Levels Selection

The formulation with different levels of binder (Hypromellose) was prepared and shown in table 7. The results were presented in Table 8. Hypromellose (binder) increases incrementally from 1 mg to 6 mg across formulations, accompanied by a proportional decrease in Microcrystalline Cellulose and Lactose Monohydrate in the internal phase. Total tablet weight remains constant at 113.2 mg.

TABLE 5

Composition of Rivaroxaban Tablet Formulations (mg/tablet) with Varied Hypromellose levels

| | mg/tablet | | | | | |
|---|---|---|---|---|---|---|
| Ingredients | Formulation 17 | Formulation 18 | Formulation 19 | Formulation 20 | Formulation 21 | Formulation 22 |
| Internal phase | | | | | | |
| Rivaroxaban | 20 | 20 | 20 | 20 | 20 | 20 |
| Kollidon CL-F | 10 | 10 | 10 | 10 | 10 | 10 |
| Hypromellose | 1 (30% in binder solution) | 2(30% in binder solution) | 3(30% in binder solution) | 4(30% in binder solution) | 5(30% in binder solution) | 6(30% in binder solution) |
| Microcrystalline Cellulose | 37.58 | 37.08 | 36.58 | 36.08 | 35.58 | 35.08 |
| Lactose Monohydrate | 29.92 | 29.42 | 28.92 | 28.42 | 27.92 | 27.42 |
| Sodium Lauryl Sulphate | 0.5(100% in binder solution) | 0.5(100% in binder solution) | 0.5(100% in binder solution) | 0.5(100% in binder solution) | 0.5(100% in binder solution) | 0.5(100% in binder solution) |
| External phase | | | | | | |
| Sodium Stearyl Fumarate | 2.0 | 2.0 | 2.0 | 2.0 | 2.0 | 2.0 |
| Microcrystalline Cellulose | 11.1 | 11.1 | 11.1 | 11.1 | 11.1 | 11.1 |
| Silicon Dioxide | 1.1 | 1.1 | 1.1 | 1.1 | 1.1 | 1.1 |
| Total tablet weight | 113.2 | 113.2 | 113.2 | 113.2 | 113.2 | 113.2 |

Preparation: Step 1: SLS and a portion of HPMC (30% of total HPMC) were dissolved in purified water to form Binder Solution 1. Step 2: The remaining HPMC was dry-mixed with Rivaroxaban, Kollidon CL-F, Lactose Monohydrate and Microcrystalline Cellulose, followed by sieving. Steps 3-7 followed the same protocol as Process 1 described in Example 4.

TABLE 6

Outcomes of F14 to F19

| Attributes | Acceptance criteria | Formulation 17 | Formulation 18 | Formulation 19 | Formulation 20 | Formulation 21 | Formulation 22 |
|---|---|---|---|---|---|---|---|
| Assay | 95%~105% | 98.6% | 99.7% | 100.4% | 101.4% | 102.2% | 101.9% |
| Disintegration time, Seconds | ≤60 s | 35 | 36 | 47 | 53 | 78 | 142 |
| Dissolution, 15 min | ≥85% | 81.3 | 85.7 | 92.6 | 92.8 | 94.4 | 93.2 |

In conclusion: All Formulations meet acceptance criteria (95-105%), with values ranging from 98.6% to 102.2%. Disintegration time exhibited a clear dependency on hypromellose (HPMC) content: it increased from 35 s (F17) to 142 s (F22), exceeding the acceptance limit (<60 s) for F21 and F22. Dissolution at 15 minutes improved with higher HPMC levels, with F17 (81.3%) falling below the ≥85% threshold, while F18-F21 achieved compliance (85.7-94.4%). F18-F20 demonstrated optimal balance, meeting both disintegration and dissolution criteria.

Example 4—MCC/Lactose Ratio

The formulation with different ratio of filler (MCC and lactose monohydrate) was prepared and shown in table 9.

TABLE 9

The formulation composition of different ratio of MCC/Lactose Monohydrate

| | 20 mg/tablet | | | | |
|---|---|---|---|---|---|
| Component | Formulation 23 (1.96:1) | Formulation 24 (1.96:1) | Formulation 25 (1.54:1) | Formulation 26 (1:1) | Formulation 27 (1:1.54) |
| Internal phase | | | | | |
| Rivaroxaban | 20 | 20 | 20 | 20 | 20 |
| Kollidon CL-F | 10 | 10 | 10 | 10 | 10 |
| Hypromellose | 1 | 1 | 1 | 1 | 1 |
| Microcrystalline Cellulose(MCC) | 40.26 | 40.26 | 40.26 | 33.20 | 26.14 |
| Lactose Monohydrate | 26.14 | 26.14 | 26.14 | 33.20 | 40.26 |
| Sodium Lauryl Sulphate | 0.6 | 0.6 | 0.6 | 0.6 | 0.6 |
| External phase | | | | | |
| Sodium Stearyl Fumarate | 2 | 2 | 2 | 2 | 2 |
| Microcrystalline Cellulose | 11.1 | 11.1 | — | — | — |
| Colloidal Silicon Dioxide | — | 1.1 | — | — | — |
| Total tablet weight | 111.1 | 112.2 | 100 | 100 | 100 |
| Disintegration time (DT) | 52 s | 44 s | 64 s | 83 s | 103 s |
| Dissolution (Q at 30 min) | 99.25% | 99.25% | 98.0% | 97.3% | 95.6% |

The result showed external phase of MCC and Colloidal Silicon Dioxide (formulation 14) can shorten Disintegration time (44 s). The lower the ratio of MCC/Lactose Monohydrate, the longer DT is. The DT of tablet was 103 s when the MCC/Lactose ratio is 1:1~1:1.54 (formulation 26 and Formulation 27), which are not acceptable.

Example 5—Lubricant Level

Magnesium Stearate is a hydrophobic lubricant and Sodium Stearyl Fumarate is a hydrophilic lubricant. The formulation 28 with Magnesium Stearate has a longer DT and the formulation with Sodium Stearyl Fumarate ranging 1.3%-2.2% do not show any difference in terms of DT and dissolution.

TABLE 10

The composition of different types and levels of lubricant

| | 10 mg/tablet | | | |
|---|---|---|---|---|
| Component | Formulation 28 | Formulation 29 | Formulation 30 | Formulation 31 |
| Internal phase | | | | |
| Rivaroxaban | 10 | 10 | 10 | 10 |
| Kollidon CL-F | 10 | 10 | 10 | 10 |
| Hypromellose E5 | 1.5 | 1.5 | 1.5 | 1.5 |
| Microcrystalline Cellulose | 42.17 | 42.17 | 42.17 | 42.17 |
| Lactose Monohydrate | 33.73 | 33.73 | 33.73 | 33.73 |
| Colloidal Silicon Dioxide | 1.1 | 1.1 | 1.1 | 1.1 |
| Sodium Lauryl Sulphate | 0.5 | 0.5 | 0.5 | 0.5 |
| External phase | | | | |
| Magnesium Stearate | 2 | / | / | / |
| Sodium Stearyl Fumarate | / | 1.5 | 2 | 2.5 |
| Microcrystalline Cellulose | 11.1 | 11.6 | 11.1 | 10.6 |
| Colloidal Silicon Dioxide | 1.1 | 1.1 | 1.1 | 1.1 |
| Total tablet weight | 113.2 | 113.2 | 113.2 | 113.2 |
| Disintegration time (DT) | 50 s | 31 s | 33 s | 31 s |
| Dissolution (Q at 30 min) | 100.4% | 101.1% | 99.7% | 98.8% |

Example 6—Silicon Dioxide Levels

The formulation with different levels of Colloidal Silicon Dioxide was prepared and shown in table 11. All the formulations have acceptable DT, assay and dissolution profile.

TABLE 11

The composition of different levels of Colloidal Silicon Dioxide

| | 10 mg/tablet | | | |
|---|---|---|---|---|
| Component | Formulation 32 | Formulation 33 | Formulation 34 | Formulation 35 |
| Internal phase | | | | |
| Rivaroxaban | 10 | 10 | 10 | 10 |
| Kollidon CL-F | 10 | 10 | 10 | 10 |
| Hypromellose E5 | 1.5 | 1.5 | 1.5 | 3 |
| Microcrystalline Cellulose | 42.17 | 42.72 | 42.44 | 42.17 |
| Lactose Monohydrate | 33.73 | 34.28 | 34.01 | 33.33 |
| Colloidal Silicon Dioxide | 1.1 | 0 | 0.55 | 0 |
| Sodium Lauryl Sulphate (SLS) | 0.5 | 0.5 | 0.5 | 0.5 |
| External phase | | | | |
| Sodium Stearyl Fumarate | 2 | 2 | 2 | 2 |
| Microcrystalline Cellulose | 11.1 | 11.1 | 11.1 | 11.1 |
| Colloidal Silicon Dioxide | 1.1 | 1.1 | 1.1 | 1.1 |
| Total tablet weight | 113.2 | 113.2 | 113.2 | 113.2 |
| Disintegration time (DT) | 33 s | 53 s | 45 s | 55 s |
| Dissolution (Q at 30 min) | 99.7% | 101.1% | 99.4% | 100.4% |

Example 7—Different Strength

The formulation with different strength of Rivaroxaban was prepared and shown in table 8. All the formulations have acceptable DT, assay and dissolution profile.

TABLE 12

The composition of formulation with different strength

| | mg/tablet | | | |
|---|---|---|---|---|
| Component | 2.5 | 10 | 15 | 20 |
| Internal phase | | | | |
| Rivaroxaban | 2.5 | 10 | 15 | 20 |
| Kollidon CL-F | 10 | 10 | 10 | 10 |
| Hypromellose | 3 | 3 | 3 | 3 |
| Microcrystalline Cellulose | 46.67 | 42.17 | 39.38 | 36.58 |
| Lactose Monohydrate | 36.33 | 33.33 | 31.12 | 28.92 |
| Sodium Lauryl Sulphate | 0.5 | 0.5 | 0.5 | 0.5 |
| External phase | | | | |
| Sodium Stearyl Fumarate | 2.0 | 2.0 | 2.0 | 2.0 |
| Microcrystalline Cellulose | 11.1 | 11.1 | 11.1 | 11.1 |
| Colloidal Silicon Dioxide | 1.1 | 1.1 | 1.1 | 1.1 |
| Total tablet weight | 113.2 | 113.2 | 113.2 | 113.2 |

Example 8. Comparison of Production Processes

Formulation A-4 was prepared according to Processes 1-3. The composition of A-4 is shown in Table 9.

TABLE 9

The composition of formulation A-4

| Component | 10 mg/tablet Formulation A-4 |
|---|---|
| Internal phase | |
| Rivaroxaban | 10 |
| Kollidon CL-F | 10 (8.8%) |
| Hypromellose | 1.5 |
| Microcrystalline Cellulose | 42.17 |
| Lactose Monohydrate | 33.73 |
| Colloidal Silicon Dioxide | 1.1 |
| Sodium Lauryl Sulphate | 0.5 |
| External phase | |
| Sodium Stearyl Fumarate | 2 |
| Microcrystalline Cellulose | 11.1 |
| Colloidal Silicon Dioxide | 1.1 |
| Total tablet weight | 113.2 |
| Disintegration time | 114 s |
| Dissolution (Q at 30 min) | 100.4% |

Process 1: Half of binder was dissolved in granulation liquid while the other half was in the internal phase to form dry blend (similar to manufacturing process 3 in example 4).

Process 2: All the of binder was in the internal phase to form dry blend.

Process 3: All the of binder was dissolved in granulation liquid.

TABLE 10

The process effect on tablet disintegration time and dissolution

| | Process 1 | Process 2 | Process 3 |
|---|---|---|---|
| Assay | 99.4% | 93.7% | 100.5% |
| Disintegration time | 33 s | 35 s | 114 s |
| Dissolution (Q at 30 min) | 99.7% | 92.9% | 100.4% |

Process 1 significantly shorten the integration time of the tablet compared to process 3 (33 s vs. 114 s). And the tablet with process 2 do not has an acceptable assay (93.7%).

Example 9—Different Levels of Binder

The formulation with different levels of binder (Hypromellose) was prepared and shown in table 11. The tablets were prepared by dividing binder into two parts, 0.75 mg binder was dissolved in granulation liquid and the rest binder was in the dry blend.

TABLE 11

The composition of formulation for different levels of binder

| | 20 mg/tablet | | | |
|---|---|---|---|---|
| Component | Formulation A-9 | Formulation A-10 | Formulation A-11 | Formulation A-12 |
| Internal phase | | | | |
| Rivaroxaban | 20 | 20 | 20 | 20 |
| Kollidon CL-F | 10 | 10 | 10 | 10 |
| Hypromellose | 0 | 1 | 2 | 3.5 |
| Microcrystalline Cellulose | 40.74 | 40.26 | 39.65 | 38.74 |
| Lactose Monohydrate | 26.66 | 26.14 | 27.75 | 25.16 |
| Sodium Lauryl Sulphate | 0.6 | 0.6 | 0.6 | 0.6 |
| External phase | | | | |
| Sodium Stearyl Fumarate | 2 | 2 | 2 | 2 |
| Total tablet weight | 100 | 100 | 100 | 100 |
| Assay | 103.8% | 98.1% | 98.0% | 104.4% |
| Disintegration time (DT) | 22 s | 47 s | 62 s | 86 s |
| Dissolution (Q at 30 min) | 68.9% | 94.0% | 98.7% | 98.6% |

All the formulation has the acceptable DT (<90 s), and increasing binder amount in the formulation increase the disintegration time. However, without binder, formulation 9 does not have an acceptable dissolution profile (Q<75%). Therefore, the binder range in the formulation of this example was between 1%-3.5%.

While the invention has been disclosed in some detail by way of illustration and example for purposes of clarity of understanding, it is apparent to those in the art that various changes may be made and equivalents may be substituted without departing from the true spirit and scope of the invention. Therefore, the description and examples should not be construed as limiting the scope of the invention.

The invention claimed is:

1. A formulation for the preparation of an oral suspension, comprising an internal phase enclosed by an external phase, wherein the internal phase comprises 10 to 20 mg of rivaroxaban, 8 to 12 mg of crospovidone and 2 to 4 mg of hypromellose (HPMC), wherein the external phase comprises a lubricant,
wherein the formulation is characterized by:
(i) a porosity of 20% to 24%;
(ii) a disintegration time of less than 60 seconds in aqueous medium when tested per USP (701) methodology using 710 μm mesh screens; and
(iii) a dissolution rate of more than 90% within 15 minutes when tested using USP Apparatus II (paddle) at 75 RPM in 900 mL of pH 4.5 acetate buffer containing 0.4% w/v sodium lauryl sulfate (SLS).

2. The formulation of claim 1, wherein the internal phase is in the form of a plurality of granules being compressed together, wherein the plurality of granules comprise a first group of granules and second group of granules, wherein the first group of granules has an average particle diameter of less than 106 μm and ranges from 50% to 65% by weight in the formulation, and wherein the second group of granules has an average particle diameter of greater than 250 μm and ranges from 15% to 25% by weight in the formulation.

3. The formulation of claim 1, wherein the internal phase comprises 20 mg of rivaroxaban, 9-11 mg of crospovidone, and 3 mg of HPMC, and further comprises 45-50 mg of microcrystalline cellulose and 25-30 mg of lactose monohydrate.

4. The formulation of claim 3, wherein the external phase comprises 0.3-0.6 mg of sodium lauryl sulfate, 1.5-2.5 mg of sodium stearyl fumarate, and 0.8-1.2 mg of colloidal silicon dioxide.

5. The formulation of claim 1, wherein the internal phase comprises 20 mg of rivaroxaban, 10 mg of crospovidone, and 3 mg of HPMC, and further comprises 48 mg of microcrystalline cellulose and 29 mg of lactose monohydrate, and wherein the external phase comprises 0.5 mg sodium lauryl sulfate, 2.0 mg sodium stearyl fumarate, and 1 mg colloidal silicon dioxide.

6. The formulation of claim 1, wherein the external phase is free from rivaroxaban, crospovidone and HPMC.

7. The formulation of claim 1, wherein the HPMC has a viscosity of about 5 cps.

8. The formulation of claim 1, wherein the amounts of the excipients are selected so that the disintegration time is less than 50 seconds.

9. The formulation of claim 1, wherein the amounts of the excipients are selected so that the disintegration time is less than 50 seconds.

10. The formulation of claim 1, which is further characterized by an assay of higher than 96%.

11. The formulation of claim 1, which is in the form of a tablet.

12. The formulation of claim 1, which is prepared according to a process comprising
(a) mixing a lubricant and a first portion of HPMC in purified water to form binder solution I;
(b) mixing a second portion of HPMC with rivaroxaban, crospovidone, microcrystalline cellulose and lactose monohydrate to form a dry mixture and then sieving the dry mixture;
(c) homogenizing the sieved dry mixture to form a dry blend;
(d) spraying the binder solution I to the dry blend to form granules;
(e) milling and then drying the granules; and
(f) blending the dried granules with an external phase.

13. The formulation of claim 12, wherein the first portion of HPMC ranges from 20% to 40% in the total weight of HPMC in the formulation.

14. A method of treating or reducing the risk of a disease comprising:
(a) preparing a suspension from the formulation of claim 1; and
(b) administering the suspension to a subject in need thereof
wherein the disease is stroke or systemic embolism associated with nonvalvular atrial fibrillation, deep vein thrombosis (DVT), pulmonary embolism (PE), or myocardial infarction (MI) or stroke associated with chronic coronary artery disease (CAD) or peripheral artery disease (PAD).

15. The method of claim 14, wherein the disease is deep vein thrombosis (DVT) or pulmonary embolism (PE).

16. A method of preparing the formulation of claim 1, comprising;
(a) mixing a lubricant and a first portion of HPMC in purified water to form binder solution I;
(b) mixing a second portion of HPMC with rivaroxaban, crospovidone, microcrystalline cellulose and lactose monohydrate to form a dry mixture and then sieving the dry mixture;
(c) homogenizing the sieved dry mixture to form a dry blend;
(d) spraying the binder solution I to the dry blend to form granules;
(e) milling and then drying the granules; and
(f) blending the dried granules with an external phase.

* * * * *